United States Patent
Beers et al.

(10) Patent No.: US 8,103,363 B2
(45) Date of Patent: Jan. 24, 2012

(54) DEVICE CONTROL SYSTEM

(75) Inventors: Ted W. Beers, Corvallis, OR (US); Michael Worley, Alsea, OR (US); C. Phillip Callaway, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 11/700,331

(22) Filed: Jan. 31, 2007

(65) Prior Publication Data

US 2008/0183309 A1 Jul. 31, 2008

(51) Int. Cl.
*G05B 11/01* (2006.01)
(52) U.S. Cl. .......................................................... 700/17
(58) Field of Classification Search ................ 700/2, 17; 715/734, 735
See application file for complete search history.

(56) References Cited

U.S. PATENT DOCUMENTS

| | | | |
|---|---|---|---|
| 5,007,046 A | 4/1991 | Erving et al. | |
| 5,058,153 A | 10/1991 | Carew et al. | |
| 5,720,015 A | 2/1998 | Martin et al. | |
| 5,844,600 A | 12/1998 | Kerr | |
| 5,848,098 A | 12/1998 | Cheng et al. | |
| 6,078,809 A | 6/2000 | Proctor | |
| 6,128,649 A | 10/2000 | Smith et al. | |
| 6,148,068 A | 11/2000 | Lowery et al. | |
| 6,160,796 A * | 12/2000 | Zou | 370/257 |
| 6,300,973 B1 | 10/2001 | Feder et al. | |
| 6,327,276 B1 | 12/2001 | Robert et al. | |
| 6,535,604 B1 | 3/2003 | Provencal et al. | |
| 6,590,604 B1 | 7/2003 | Tucker et al. | |
| 6,618,764 B1 * | 9/2003 | Shteyn | 709/249 |
| 6,633,788 B1 * | 10/2003 | Riley et al. | 700/97 |
| 6,708,231 B1 | 3/2004 | Kitagawa | |
| 6,834,340 B2 | 12/2004 | Lee et al. | |
| 6,883,093 B2 | 4/2005 | McBrearty et al. | |
| 6,941,453 B2 | 9/2005 | Rao | |
| 6,947,154 B2 | 9/2005 | Kikuchi | |
| 6,989,856 B2 | 1/2006 | Firestone et al. | |
| 7,012,891 B1 | 3/2006 | Chandran et al. | |
| 7,036,007 B2 | 4/2006 | Schelling et al. | |
| 7,043,528 B2 | 5/2006 | Schmitt et al. | |
| 7,047,279 B1 | 5/2006 | Beams et al. | |
| 7,054,924 B1 * | 5/2006 | Harvey et al. | 709/220 |
| 7,055,148 B2 | 5/2006 | Marsh et al. | |
| 7,055,150 B2 | 5/2006 | Terada et al. | |
| 7,069,234 B1 | 6/2006 | Cornelius et al. | |
| 7,069,452 B1 | 6/2006 | Hind et al. | |
| 7,075,919 B1 | 7/2006 | Wendt et al. | |
| 7,103,641 B2 | 9/2006 | Brannock | |
| 2002/0093681 A1 | 7/2002 | Hitaka | |
| 2002/0140966 A1 | 10/2002 | Meade et al. | |
| 2003/0131226 A1 | 7/2003 | Spencer et al. | |
| 2003/0154471 A1 | 8/2003 | Teachman et al. | |
| 2004/0117465 A1 | 6/2004 | Bodin et al. | |
| 2004/0123091 A1 | 6/2004 | Das | |
| 2004/0184063 A1 | 9/2004 | Baldwin | |

(Continued)

*Primary Examiner* — Albert Decady
*Assistant Examiner* — Chad Rapp (57) ABSTRACT

A device control system includes a general device component, a feature definition set, and a specific device component. The feature definition set is operatively connected to the general device component. The specific device component is operatively connected to the general device component. The general device component defines an application program interface (API) for accessing a device. The feature definition set defines features associated with the device. The specific device component supports the features.

27 Claims, 3 Drawing Sheets

U.S. PATENT DOCUMENTS

| | | |
|---|---|---|
| 2005/0160257 A1 | 7/2005 | Kruger et al. |
| 2005/0190393 A1 | 9/2005 | Bledsoe et al. |
| 2005/0216718 A1 | 9/2005 | Rao |
| 2005/0251673 A1 | 11/2005 | Bosley et al. |
| 2006/0031664 A1 | 2/2006 | Wilson et al. |
| 2006/0200658 A1 | 9/2006 | Penkethman |
| 2007/0113186 A1* | 5/2007 | Coles et al. .................... 715/735 |
| 2009/0015433 A1* | 1/2009 | James et al. ............. 340/825.69 |

* cited by examiner

DEVICE CONTROL SYSTEM

CROSS-REFERENCE TO RELATED APPLICATIONS

This application is related to copending patent application Ser. No. 11/700,330 entitled "Coordinated Media Control System," filed concurrently with and assigned to the same assignee as the present application, the disclosure of which is incorporated herein by reference.

BACKGROUND

Certain systems control a number of external devices. For example, when conducting a video conference, a video conference system may control one or more media devices, such as a video camera, a microphone, and a video encoder. Each device typically includes one or more functions or features that are controlled by the system. For example, a collaboration system may control a zoom function, a pan function, and rotate function of the video camera.

Due to one or more reasons, an external device may be added, removed, or replaced in the system. Exemplary reasons include device obsolescence, superior device introduction, changing regularity requirements, cost reduction choices, and device firmware updates.

Updating a system to account for the addition, removal, and/or replacement of one or more devices may involve significant investment, such as monetary cost, additional personnel hiring, time to rework the system, and time to test the reworked system. For example, updating a system that controls external devices through software modules may involve determining the affected software modules, reprogramming the software modules, testing the software modules, documenting the reprogramming and the testing phases, and deploying the updated software modules.

For these and other reasons, there is a need for the present invention.

SUMMARY

One embodiment provides a device control system. The device control system includes a general device component, a feature definition set, and a specific device component. The feature definition set is operatively connected to the general device component. The specific device component is operatively connected to the general device component. The general device component defines an application program interface (API) for accessing a device. The feature definition set defines features associated with the device. The specific device component supports the features.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As used herein, the term "media" includes text, video, sounds, images, or other suitable digital data capable of being transmitted over a network.

As used herein, the term "node device" includes processor-based devices, input/output devices, or other suitable devices for facilitating communications among remote users. Examples of node devices include fax machines, video cameras, telephones, printers, scanners, displays, personal computers, microphones, and speakers.

As used herein, the term "node" includes any suitable environment or system configured to transmit and/or receive media via one or more node devices. In one embodiment, the environment is a collaborative environment, which enables remote users to share media across one or more node devices. A collaborative environment will enable, for example, a presenter to simultaneously give a multimedia presentation to an audience not only in the presenter's location but also in one or more remote locations. The collaborative environment may further enable the audience in the remote locations to participate in the presentation as the audience in the presenter's location would participate (e.g., ask questions to the presenter).

As used herein, the term "event" refers to a connection of a plurality of nodes such that one or more node devices of one node are configured to transmit media to and/or receive media from one or more node devices of another node.

Figure 1:
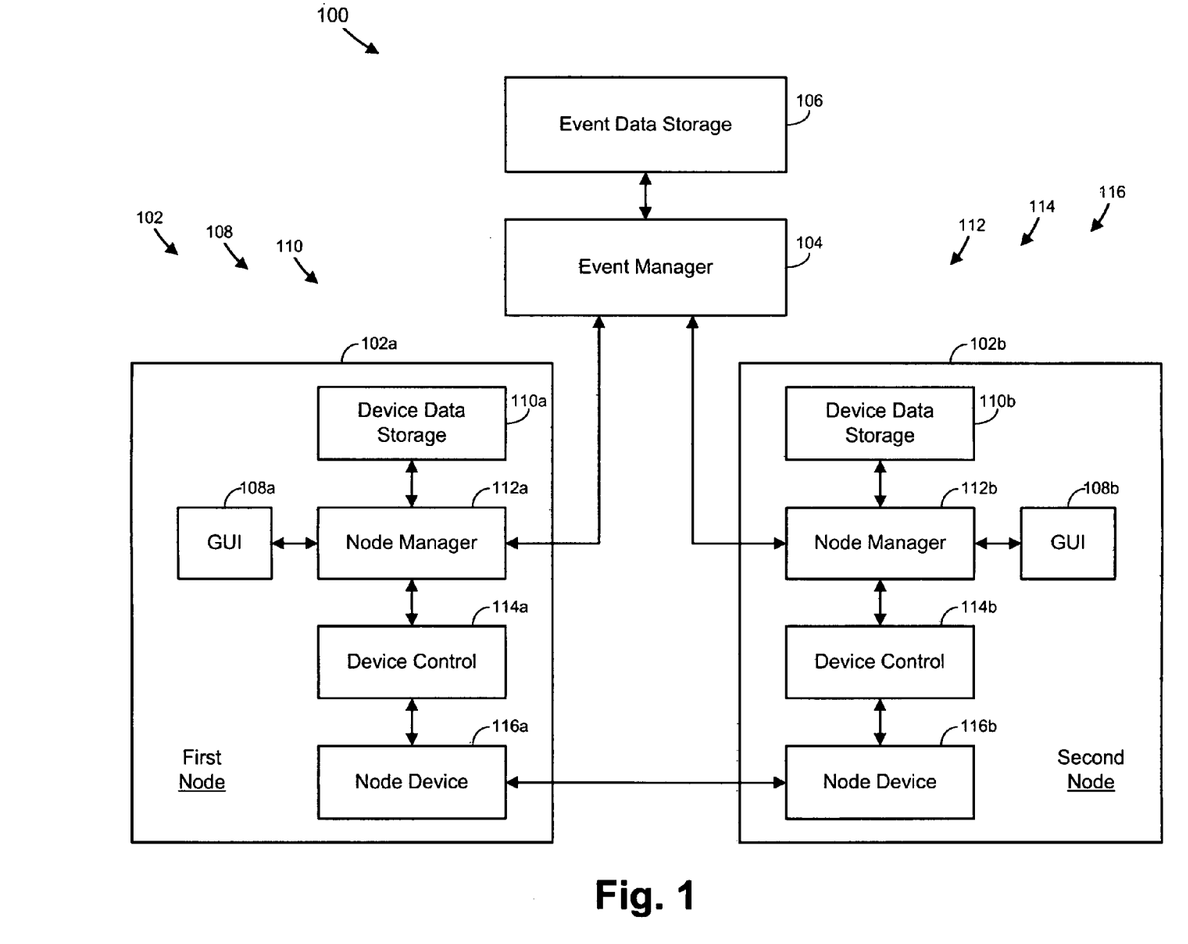
FIG. 1 illustrates a block diagram of a coordinated media control system in accordance with one embodiment.

FIG. 1 illustrates a block diagram of a coordinated media control system 100 in accordance with one embodiment. Coordinated media control system 100 includes a first node 102a, a second node 102b, an event manager 104, and an event data storage 106. First node 102a and second node 102b are collectively referred to as nodes 102. While the illustrated embodiment depicts two nodes 102, coordinated media control system 100 includes any suitable number of nodes 102 in other embodiments.

First node 102a includes a graphical user interface (GUI) 108a, a device data storage 110a, a node manager 112a, a device control system 114a, and a node device 116a. Second node 102b includes a graphical user interface (GUI) 108b, a device data storage 110b, a node manager 112b, a device control system 114b, and a node device 116b. GUI 108a and GUI 108b are collectively referred to as GUIs 108. Device data storage 110a and device data storage 110b are collectively referred to as device data storages 110. Node manager 112a and node manager 112b are collectively referred to as node managers 112. Device control system 114a and device control system 114b are collectively referred to as device control systems 114. Node device 116a and node device 116b are collectively referred to as node devices 116.

Event manager 104 is operatively connected to event data storage 106 and node managers 112. Node manager 112a is operatively connected to GUI 108a, device data storage 110a, and device control system 114a. Node manager 112b is operatively connected to GUI 108b, device data storage 110b, and device control system 114b. Node device 116a is operatively connected to device control system 114a and node device 116b, which is operatively connected to device control system 114b. In one embodiment, one or more of the connections in coordinated media control system 100 are operatively connected via one or more suitable computer networks, such as a local area network (LAN) or the Internet. In one embodiment, one or more components of coordinated media control system 100 communicate via one or more suitable network protocols, such as TCP/IP.

In one embodiment, event manager 104 is configured to manage information describing the state of an event. Examples of information describing the state of an event include the identity of nodes 102 and node devices 116 participating in an event, the relationships among nodes 102 and node devices 116, and the intent or manner in which each node 102 and node device 116 is participating. In another embodiment, event manager 104 is also configured to instruct nodes 102 to operate in accordance with event management policies stored in event data storage 106.

Event management policies include any suitable conditions or restrictions for creating, executing, and terminating an event. Examples of event management policies include the number of nodes 102 permitted to join an event, the types of nodes 102 permitted to join an event, and data relating to the progress of the event (e.g., duration of an event, available bandwidth). The operation and configuration of event manager 104 is described in greater detail in Ser. No. 11/497,886 entitled "System and Method for Managing Virtual Collaboration Systems," filed Aug. 2, 2006 and assigned to the same assignee as the present application, the disclosure of which is incorporated herein by reference.

Node managers 112 are configured to establish and coordinate media streams for transmitting media between node devices 116. As illustrated in the embodiment of FIG. 1, node managers 112 operate in accordance with instructions received from attendees via GUIs 108 and in accordance with the event management policies provided by event manager 104. In one embodiment, GUIs 108 provide a user interface enabling attendees to create, execute, and terminate events between nodes 102. GUIs 108 include any suitable input/output devices, such as a mouse and a display, for communicating with node managers 112.

In one embodiment, GUIs 108 provide attendees with a natural and logical environment for coordinating node devices 116. In particular, GUIs 108 allow attendees to operate node devices 116 for sharing media streams without the need for specific knowledge of the interface for each node device 116. For example, if the attendee in first node 102a desires to share image data recorded from an overhead camera in first node 102a, the attendee is able to control functions of the camera, such as zoom and focus, through GUI 108a without the need for specific knowledge regarding the brand or model of the camera. Further, the attendee is unburdened with the complications of establishing media connections among a plurality of node devices 116 with different interfaces. For example, if an attendee in first node 102a desires to share image data from an overhead camera in first node 102a to a display in second node 102b, the attendee is able to select the overhead camera and the display through GUI 108a.

In one embodiment, node managers 112 configure and control node devices 116 in accordance with node information stored in device data storages 110. Node information includes any suitable configuration and control information specific to the particular nodes in which device data storages 110 are located. Examples of node information include the state of the nodes (e.g., online or unavailable), event participation configuration and control data (e.g., the manner and priority in which a node can participate in an event), node device configuration and control data (e.g., command sequences for operating node devices 116), and user interface data (e.g., the default language of GUIs 108). In one embodiment, only node manager 112a or other components within first node 102a is permitted to access device data storage 110a. In one embodiment, only node manager 112b or other components within second node 102b is permitted to access device data storage 110b.

In one embodiment, the node information related to first node 102a and node device 116a is stored in device data storage 110a and managed by device control system 114a. In one embodiment, the node information related to second node 102b and node device 116b is stored in device data storage 110b and managed by device control system 114b.

In one embodiment, device control systems 114 provides node managers 112 with an abstracted interface to node devices 116. Device control systems 114 are described in greater detail below in reference to FIG. 2.

Figure 2:
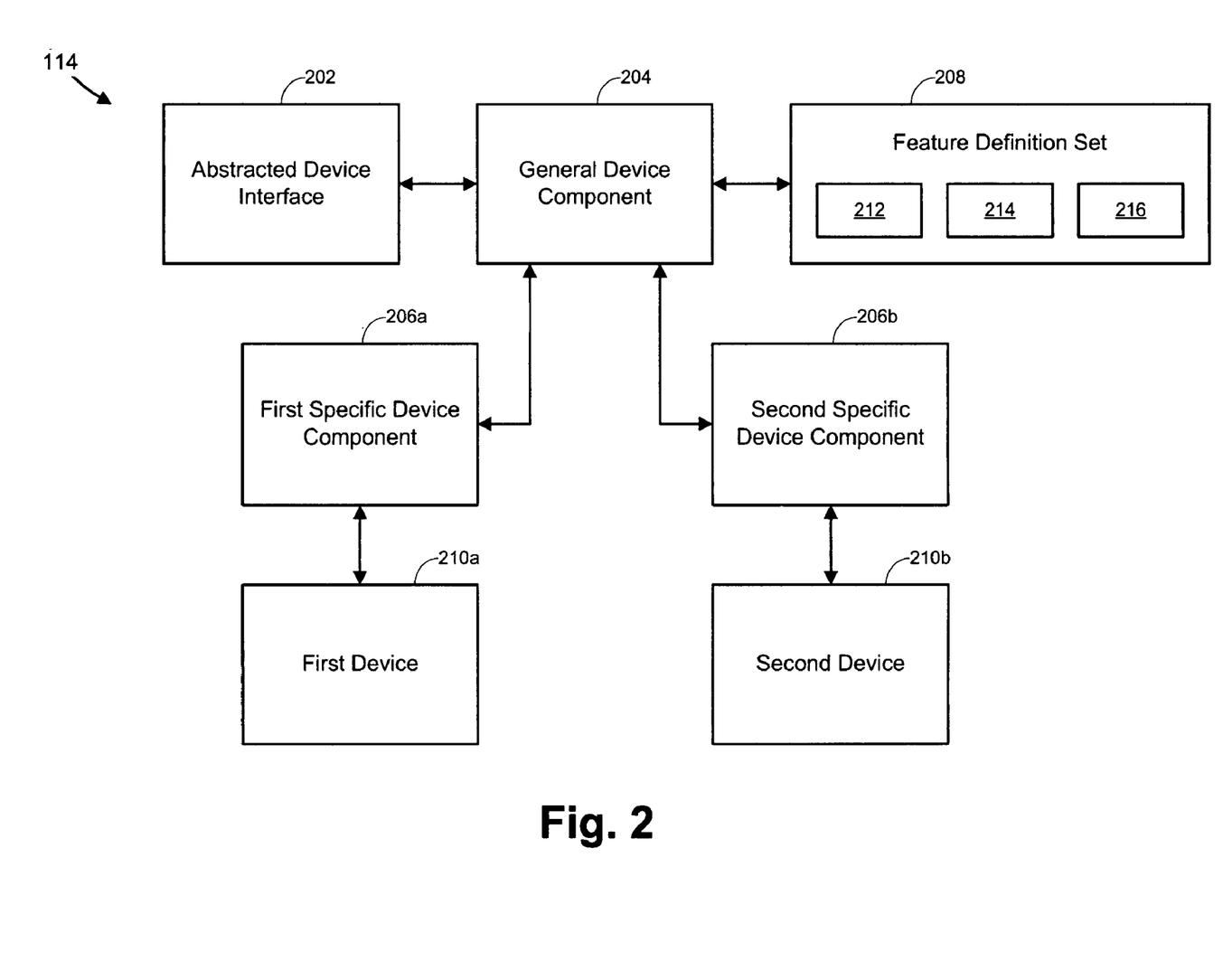
FIG. 2 illustrates a block diagram of a device control system in accordance with one embodiment.

FIG. 2 is a block diagram illustrating one embodiment of device control system 114 of FIG. 1. Device control system 114 includes an abstracted device interface 202, a general device component 204, a first specific device component 206a, a second specific device component 206b, a feature definition set 208, a first device 210a, and a second device 210b. First specific device component 206a and second specific device component 206b are collectively referred to as specific device components 206. First device 210a and second device 210b are collectively referred to as devices 210.

A user accesses abstracted device interface 202 to control devices 210. Feature definition set 208 provides a framework in which abstracted device interface 202 is able to control devices 210 without specific knowledge (e.g., brand, model, firmware version) of devices 210. General device component 204 receives abstracted control commands (i.e., ACCs) from abstracted device interface 202, translates the abstracted control commands to device-specific control commands (i.e., DCCs) using feature definition set 208, and performs the device-specific control commands on one or more of devices 210 via specific device components 206.

In one embodiment, the user, such as an attendee to a collaborative event, accesses abstracted device interface 202 through an additional interface or application, such as GUIs 108 of FIG. 1. In one embodiment, general device component 204 is connected to any suitable number of specific device components 206 and/or devices 210.

Abstracted device interface 202 provides an interface for accessing one or more abstracted control commands for device types of devices 210. The control commands are "abstracted" because the user does not need to have specific knowledge (e.g., brand, model, firmware version) of devices 210 to operate them. The device type refers to a general category of device in which a set of ACCs are defined. For example, abstracted device interface 202 may provide a zoom ACC, a pan ACC, and a rotate ACC for a video camera device type.

General device component 204 defines an application program interface (API) for interacting with devices 210 through specific device components 206. Abstracted device interface 202 utilizes the API of general device component 204. Further, general device component 204 implements a macro engine (not shown) and other related functionality to support and reduce the complexity of specific device components 206.

In one embodiment, general device component 204 supports functionality (i.e., ACCs) available in each of devices 210 through the macro engine. For example, each of devices 210 may include a reset ACC. Thus, to reduce the complexity of specific device components 206, general device component 204 may support the reset ACC for each of devices 210. The macro engine performs a sequence of bytes associated with resetting a device in devices 210. In one embodiment, the sequence of bytes to perform the functionality supported by general device component 204 is hard-coded in general device component 204. In another embodiment, the sequence of bytes to perform the functionality supported by general device component 204 is received from feature definition set 208, described in greater detail below. In one embodiment, the macro engine consumes feature definition set 208 to control the device 210. The macro engine may be a compiled-code execution system or a high-level interpreter.

General device component 204 receives the abstracted control commands (i.e., ACCs) from abstracted device interface 202. General device component 204 converts the abstracted control commands to device-specific control commands (i.e., DCCs) in accordance with feature definition set 208. Feature definition set 208 includes a command set 212, a feature set 214, and a device support set 216. In one embodiment, feature definition set 208 is stored in a database.

Command set 212 defines control and query commands particular to each of devices 210. Command set 212 is device specific. In one embodiment, command set 212 is particular to the brand, model, and/or firmware version of each of devices 210. Command set 212 expresses the control and query commands in a manner such that one with domain knowledge of each of devices 210 will appreciate the commands. In one example, given a brand of video camera, control and query commands include a "zoom-in" command and a "zoom-out" command. The control and query command "zoom-in" is associated with a sequence of bytes understood by the brand of video camera to be the command of zooming in. The control and query command "zoom-out" is associated with a sequence of bytes understood by the brand of video camera to be the command of zooming out. One with domain knowledge of the brand of video camera will understand the control and query command names and will be able to perform any of a variety of commands associated with the domain knowledge without specific knowledge of the sequence of bytes needed to perform the commands. In one embodiment, command set 212 is defined in Extensible Markup Language (XML). In other embodiments, command set 212 is defined using any suitable markup language.

Feature set 214 defines abstracted control commands (i.e., ACCs) associated with the device type for each of devices 210 in accordance with one or more of the control and query commands in command set 212. In one example, a zoom ACC associated with a video camera device type is represented as zoom-in/zoom-out control and query commands in a first brand of video camera and as telescope control and query commands in a second brand of video camera. If a user uses the first brand of video camera, then the zoom-in/zoom out control and query commands are mapped to the zoom ACC. If a user desires to swap the first brand of video camera with the second brand of video camera, the user redefines the zoom ACC as being mapped to the telescope control and query commands instead of the zoom-in/zoom-out control and query commands. The swapping of control and query commands enables the user to easily and naturally operate a zoom ACC on two different brands of video camera without specific knowledge of the operation of each video camera.

Device support set 216 provides device-related information associated with the command set 212 and the feature set 214. In one embodiment, device support set 216 includes a specification to use a serial port input/output (I/O) protocol, such as RS-232, to communicate (e.g., send the sequence of bytes associated with a control and query command) with each of devices 210. The additional information provided in device support set 216 is particular to each of devices 210 and is mapped to each ACC of feature set 214. If one device is swapped for another device in devices 210, the mapping between the additional information of device support set 216 and the ACC of feature set 214 may change.

Specific device components 206 each provide a macro engine similar to the one provided by general device component 204. Specific device components 206 inherit the functionality supported by general device component 204. Each of specific device components 206 further supports additional functionality associated with each of devices 210. In one example, if first device 210a is a video camera and second device 210b is a microphone, first specific device component 206a supports a zoom ACC, a pan ACC, and a rotate ACC, and second specific device component 206b supports a mute ACC and an unmute ACC.

Specific device components 206 execute the associated device-specific control commands on devices 210. Devices 210 include any suitable devices capable of being controlled using features definition set 208. In one embodiment, devices 210 include node devices 116 of FIG. 1.

Figure 3:
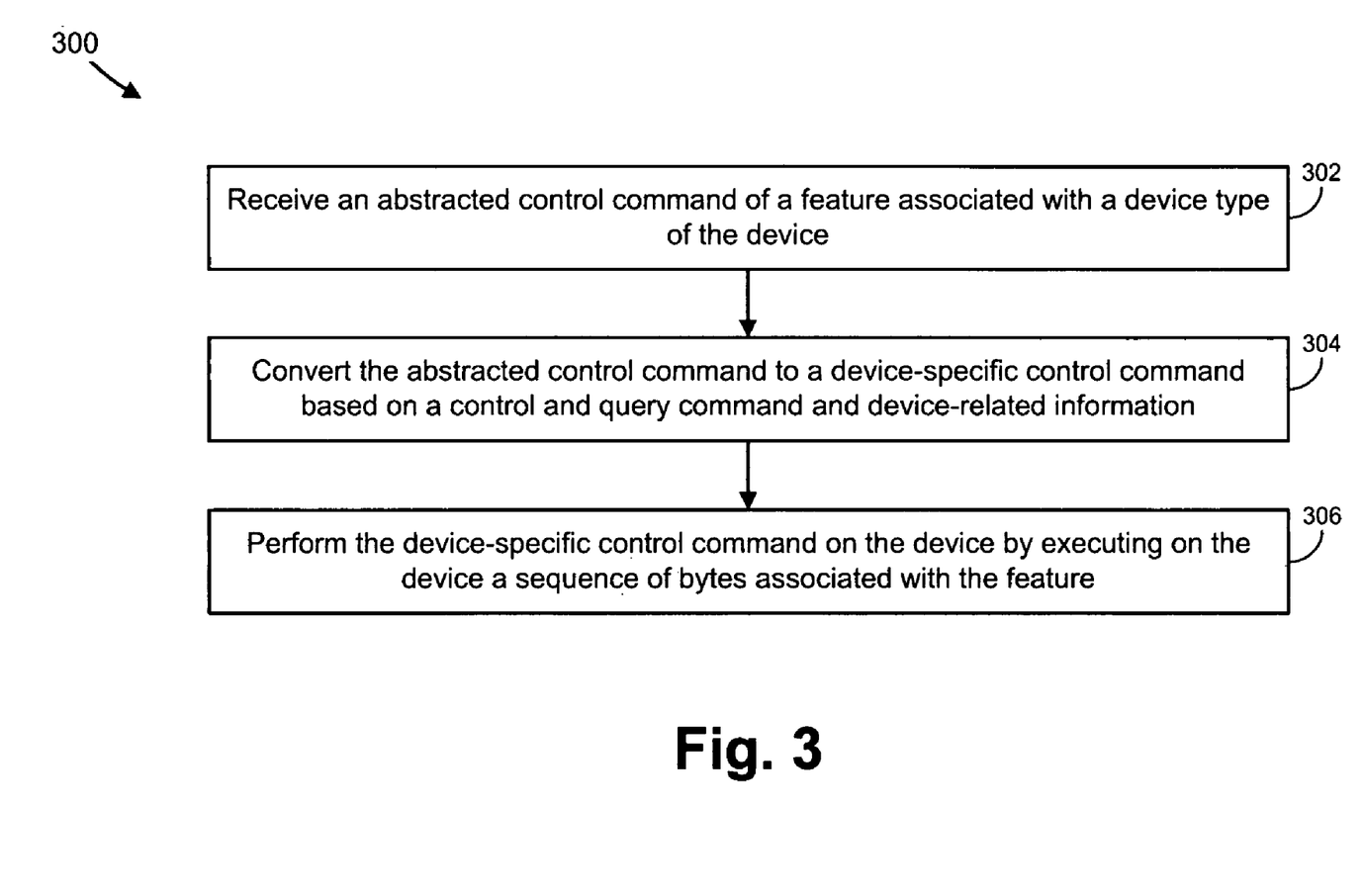
FIG. 3 illustrates a flow diagram of a method of controlling a device in accordance with one embodiment.

FIG. 3 illustrates a flow diagram of a method 300 of controlling a device in accordance with one embodiment. With reference to FIG. 2, general device component 204 receives (at 302) from abstracted device interface 202 an abstracted control command (i.e., ACC) of a feature associated with a device type of the device. General device component 204 converts (at 304) the abstracted control command to a device-specific control command based on a control and query command and device-related information obtained from feature definition set 208. The specific device component 206 performs (at 306) the device-specific control commands on the device by executing on the device a sequence of bytes associated with the feature.

Embodiments of the invention provide a user the ability to interactively develop and deploy the command sequence needed to control a device to perform various abstracted commands associated with the device type. Possessing domain knowledge of the device is sufficient for a user to define the device commands associated with the abstracted commands of the device type. The user need not possess specific programming knowledge or tools associated with the device. Such a user may be associated with an operations team tasked with, for example, qualifying, testing, and deploying a new device.

Embodiments of the invention separate software development and deployment from the device feature definitions, thereby eliminating the need for expensive specialized software development, testing, and deployment. Embodiments of the invention further separate logically and physically the device feature execution components from the device feature definitions, thereby allowing each to be optimally and independently managed.

Embodiments of the invention compartmentalize the details of the device feature definitions in a feature definition set, thereby reducing the risk of unintended change when swapping one device for another device.

Embodiments of the invention define features of a device in a command set such that a user with domain knowledge of the device can understand the definitions and their purpose.

Embodiments of the invention provide a feature definition set that is readily generated by another process, such as command set extraction from device documentation, readily translated for other purposes, such as feature implementation documentation, readily transportable among differing implementation technologies, such as different databases or operating systems, and divisible for other purposes, such as specialized execution of commands associated with a feature.

Embodiments described and illustrated with reference to the Figures provide systems and methods for device control. It is to be understood that not all components and/or steps described and illustrated with reference to the Figures are required for all embodiments. In some embodiments, at least a portion of the system includes an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device control system for incorporation in a system having at least a first node and a second node between which media streams are exchanged, comprising:
    an abstracted device interface allowing a user associated with the first node to control a device associated with the first node without specific knowledge of the device, such that one or more features of media streams exchanged between the device associated with the first node and a device associated with the second node are controlled by the user associated with the first node, the abstracted device interface further allowing a user associated with the second node to control a device associated with the second node without specific knowledge of the device, such that one or more features of media streams exchanged between the device associated with the second node and a device associated with the first node are controlled by the user associated with the second node;
    a general device component coupled to the abstracted device interface and defining an application program interface (API) for accessing the device;
    a feature definition set operatively connected to the general device component, the feature definition set defining a feature associated with the device; and
    a specific device component operatively connected to the general device component, the specific device component supporting the feature;
    wherein an abstracted control command from the abstracted device interface is translated to a device-specific control command using the feature definition set.

2. The device control system of claim 1, wherein the device is operatively connected to the specific device component.

3. The device control system of claim 1, wherein the feature definition set comprises:
    a command set defining control and query commands particular to the device;
    a feature set defining the feature;
    a device support set providing device-related information associated with the command set and the feature set; and
    wherein the feature is defined by at least one of the control and query commands and at least a portion of the device-related information.

4. The device control system of claim 3, wherein the command set is defined in Extensible Markup Language (XML).

5. The device control system of claim 3, wherein each of the control and query commands is defined by a sequence of bytes performed on the device.

6. The device control system of claim 3, wherein the device support set defines a communications protocol for communicating with the device.

7. The device control system of claim 1, wherein the specific device component comprises:
    a macro engine for performing a sequence of bytes associated with the feature on the device.

8. The device control system of claim 1, wherein the device associated with the first node is one of a group comprising a fax machine, a video camera, a telephone, a printer, a scanner, a display, a personal computer, a microphone and a speaker.

9. A device control system for incorporation in a system having at least a first node and a second node between which media streams are exchanged, comprising:
    an abstracted device interface allowing a user associated with the first node to control a device associated with the first node without specific knowledge of the device, such that one or more features of media streams exchanged between the device associated with the first node and a device associated with the second node are controlled by the user associated with the first node, the abstracted device interface further allowing a user associated with the second node to control a device associated with the second node without specific knowledge of the device, such that one or more features of media streams exchanged between the device associated with the second node and a device associated with the first node are controlled by the user associated with the second node;
    a general device component coupled to the abstracted device interface and defining an application program interface (API) for accessing a first device and a second device;
    a feature definition set operatively connected to the general device component, the feature definition set defining first specific features associated with the first device and second specific features associated with the second device;
    a first specific device component operatively connected to the general device component and the first device; and
    a second specific device component operatively connected to the general device component and the second device;
    wherein the general device component supports general features available on the first device and the second device;
    wherein the first specific device component supports the first specific features available on the first device;
    wherein the second specific device component supports the second specific features available on the second device; and wherein an abstracted control command from the abstracted device interface is translated to a device-specific control command using the feature definition set.

10. The device control system of claim 9, wherein the general device component comprises a first macro engine for performing a sequence of bytes associated with each of the general features, the first specific device component comprises a second macro engine for performing a sequence of bytes associated with each of the first specific features, and the second specific device component comprises a third macro engine for performing a sequence of bytes associated with each of the second specific features.

11. The device control system of claim 10, wherein the first specific device component and the second specific device component inherit the functionality performed by the general device component.

12. The device control system of claim 9, wherein the feature definition set further defines the general features available on the first device and the second device.

13. The device control system of claim 9, wherein the feature definition set comprises:
   a command set defining control and query commands particular to the first device and the second device;
   a feature set defining the first specific features available on the first device and the second specific features available on the second device; and
   a device support set providing device-related information associated with the command set and the feature set;
   wherein each of the first specific features and the second specific features is defined by at least one of the control and query commands and at least a portion of the device-related information.

14. The device control system of claim 13, wherein the command set is defined in Extensible Markup Language (XML).

15. The device control system of claim 13, wherein each of the control and query commands is defined by a sequence of bytes performed on the first device and the second device.

16. The device control system of claim 13, wherein the device support set defines a communications protocol for communicating with the first device and the second device.

17. A coordinated media control system, comprising:
   a first node manager operatively connected to a first node and a second node manager operatively connected to a second node;
   a first device control system operatively connected to the first node manager and a second device control system operatively connected to the second node manager; and
   a first device operatively connected to the first device control system and a second device operatively connected to the second device control system;
   wherein the first node manager is configured to establish and coordinate one or more features of media streams for at least one of transmitting media from the first device to the second device of the second node and receiving media to the first device from the second device in response to input from a user to the first node manager and wherein the second node manager is configured to establish and coordinate one or more features of media streams for at least one of transmitting media from the second device to the first device of the first node and receiving media to the second device from the first device in response to input from a user to the second node manager;
   wherein the first device control system comprises:
      an abstracted device interface allowing the user to control the first device without specific knowledge of the first device;
      a general device component defining an application program interface (API) for accessing the first device;
      a feature definition set operatively connected to the general device component, the feature definition set defining a feature associated with the first device; and
      a specific device component operatively connected to the general device component, the specific device component supporting the feature;
      wherein an abstracted control command from the abstracted device interface is translated to a device-specific control command using the feature definition set.

18. The coordinated media control system of claim 17, wherein the device is operatively connected to the specific device component.

19. The coordinated media control system of claim 17, wherein the feature definition set comprises:
   a command set defining control and query commands particular to the device;
   a feature set defining the feature;
   a device support set providing device-related information associated with the command set and the feature set; and
   wherein the feature is defined by at least one of the control and query commands and at least a portion of the device-related information.

20. The coordinated media control system of claim 19, wherein the command set is defined in Extensible Markup Language (XML).

21. The coordinated media control system of claim 19, wherein each of the control and query commands is defined by a sequence of bytes performed on the device.

22. The coordinated media control system of claim 19, wherein the device support set defines a communications protocol for communicating with the device.

23. The coordinated media control system of claim 17, wherein the specific device component comprises:
   a macro engine for performing a sequence of bytes associated with the feature on the device.

24. A method of controlling a device in a media control system having at least a first node and a second node between which media streams are exchanged, comprising:
   issuing an abstracted control command from a user associated with the first node and a user associated with the second node in the media control system such that the issuance of the abstracted control command allows the user associated with the first node to control a device associated with the first node and the user associated with the second node to control a device associated with the second node, each without specific knowledge of the device by the user, and such that one or more features of media streams are exchanged between the device associated with the first node and a device associated with the second node;
   receiving the abstracted control command of a feature associated with a device type of the devices associated with the first node and second nodes;
   converting the abstracted control command to a device-specific control command based on a control and query command and device-related information; and
   performing the device-specific control command on the devices associated with the first and second nodes by executing on the devices associated with the first and second nodes a sequence of bytes associated with the feature thereby causing the devices associated with the first and second nodes to exchange one or more features of media streams with the devices associated with the second and first nodes.

25. The method of claim 24, wherein receiving an abstracted control command of a feature associated with a device type of the device comprises receiving the abstracted control command from an abstracted device interface.

26. The method of claim 24, wherein converting the abstracted control command to a device-specific control command based on a control and query command and device-related information comprises converting the abstracted control command to a device-specific control command based on a feature definition set including a command set, a feature set, and a device support set.

27. The method of claim 24, wherein performing the device-specific control command on the device by executing a sequence of bytes associated with the feature comprises performing the device-specific control command on the device by instructing a macro engine to execute the sequence of bytes associated with the feature.

* * * * *